United States Patent [19]

Anderson

[11] Patent Number: 4,850,425
[45] Date of Patent: Jul. 25, 1989

[54] APPARATUS FOR PREPARING ADHESIVES FOR APPLICATION

[76] Inventor: Steven R. Anderson, 6416 Josephine Ave., Edina, Minn. 55435

[21] Appl. No.: 36,013

[22] Filed: Apr. 6, 1987

[51] Int. Cl.$^4$ .......................... F25B 29/00; B67D 5/62
[52] U.S. Cl. .................................. 165/65; 222/146.1; 222/318; 425/144; 425/378.1; 264/40.6
[58] Field of Search ............... 222/146.1, 146.5, 146.6, 222/318; 425/144, 384, 378 R, 378 S, 379 R, 379 S; 264/211.21, 177.19, 40.6; 165/61, 64, 65

[56] References Cited

U.S. PATENT DOCUMENTS

| | | | |
|---|---|---|---|
| 2,809,772 | 10/1957 | Weisz | 222/146.1 |
| 3,352,956 | 11/1967 | Meyer | 264/211.21 |
| 3,354,504 | 11/1967 | Lehner | 165/64 |
| 3,386,495 | 6/1968 | McCurdy et al. | 165/61 |
| 3,531,023 | 9/1970 | Mercer | 222/146.5 |
| 3,792,801 | 2/1974 | Baker et al. | 222/146.5 |
| 3,826,224 | 7/1974 | Baker et al. | 222/146.5 |
| 3,876,105 | 4/1975 | Kelling | 222/146.5 |
| 4,249,877 | 2/1981 | Machen | 425/379 R |
| 4,308,447 | 12/1981 | Notzold et al. | 425/144 |
| 4,309,114 | 1/1982 | Klein et al. | 264/211.21 |
| 4,505,669 | 3/1985 | Rogers | 222/146.5 |
| 4,545,504 | 10/1985 | Fabel et al. | 222/146.5 |
| 4,667,850 | 5/1987 | Scholl et al. | 222/146.5 |

*Primary Examiner*—John Ford

[57] ABSTRACT

A melter for adhesives such as hot melt adhesives or the like including a high melt zone having high melt heater means for heating the adhesive in the high melt zone to a preselected application temperature, a feed hopper positioned vertically above the high melt zone and a cooling mechanism positioned vertically above the high melt heater means to create a thermal barrier between the high melt heater means and the feed hopper to prevent migration of heat from the high melt zone to the feed hopper. The present invention also relates to a method for preparing adhesives for application including heating the adhesive to a preselected application temperature in a high melt zone and forming a thermal barrier in an area vertically above the high melt zone to limit the upward migration of heat from such zone.

17 Claims, 4 Drawing Sheets

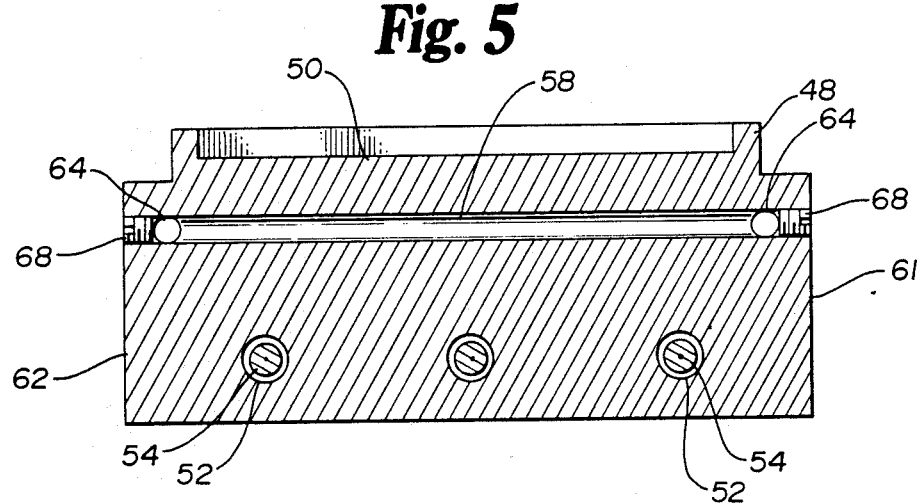
Fig. 5
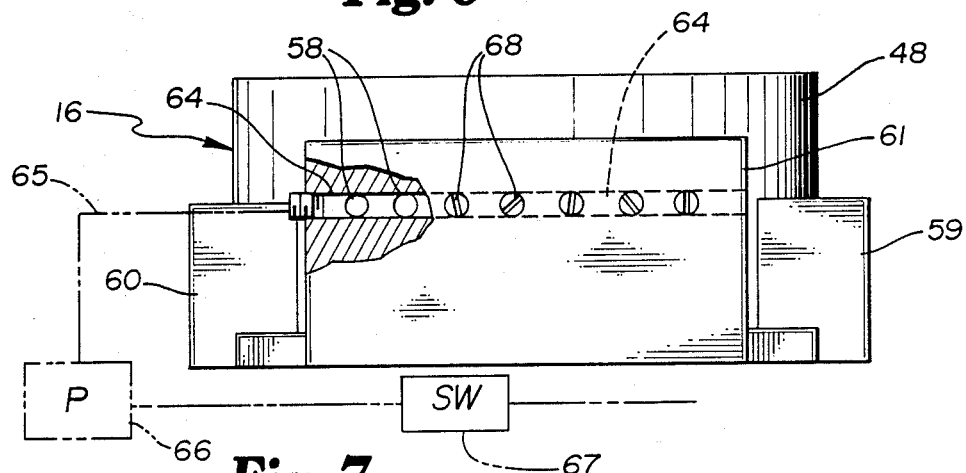
Fig. 6
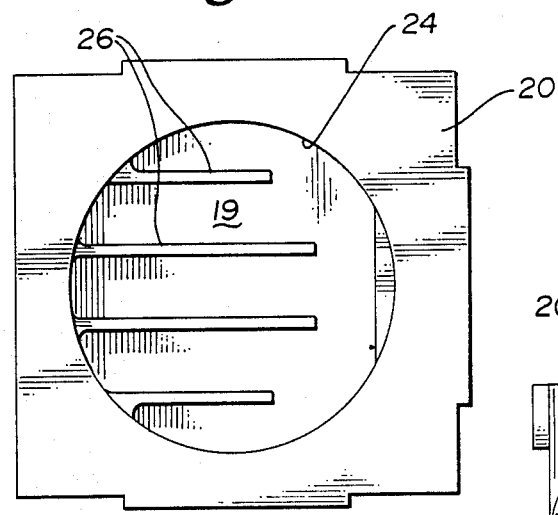
Fig. 7
Fig. 8

APPARATUS FOR PREPARING ADHESIVES FOR APPLICATION

BACKGROUND OF THE INVENTION

The present invention relates generally to a method and apparatus for preparing thermal adhesives such as thermoplastic, hot melt adhesives for application, and more particularly, to a method and apparatus for creating a thermal barrier in a hot melt adhesive heater or melter for the purpose of controlling and limiting the temperature rise of the adhesive in such melter. This minimizes degradation of the adhesives as a result of exposure to high temperatures for extended periods of time.

Thermal adhesives, and particularly those commonly referred to as hot melt adhesives, have been around for many years and are useful in a variety of applications. Hot melt adhesive stock is a solid or highly viscous material at room temperature and is normally provided in various forms such as pellets, granules or the like. Application of the adhesive involves heating the adhesive to an application temperature, during which the adhesive material changes from a highly viscous or solid state to a less viscous or liquid state, and then applying the same while in the less viscous or liquid state at the application temperature. As the adhesive cools, it hardens and exhibits its adhesive properties. While the adhesive material is at its application temperature, it is subject to degradation or charring. In general, minimal degradation occurs as a result of heating the adhesives to the application temperature and maintaining it at that temperature for a relatively short period of time. However, maintaining the adhesive at the application temperature for significant periods of time (generally greater than ten minutes or more) will result in dramatically increased degradation of the materials, thereby resulting in increased incidence of bond failures. Maintaining certain adhesives at the application temperature for extended periods of time can also result in the release of undesirable or dangerous fumes or other pollutants.

There are two types of adhesive melters which are currently utilized. One is a single stage melter while the other is a zone melter. A single stage melter consists of a single melting chamber having a single temperature control. During operation, the heaters associated with the single stage melter maintain the adhesive within the melting chamber at the application temperature at all times. As adhesive is drawn off for application, new, solid or highly viscous adhesive is added to the melting chamber. This new material settles to the bottom of the melting chamber because of its greater density, which is where the materials are drawn from the chamber for application. This creates generally wide temperature ranges of adhesive being drawn off for application, thereby resulting in weak or failed bonds. Also, if the application of the adhesive is stopped or delayed for an extended period of time, the adhesive in the melting chamber continues to be maintained at the application temperature and undesirable degradation or polymerization occurs.

In a multiple zone melter, an improvement is achieved by providing a high melt zone in which the temperature of the adhesive in such zone is maintained at the application temperature and a low melt or pre-melt zone in which the adhesive is maintained at a temperature approximately 50°–150° lower than the application temperature. In zone melters of this type, newly added adhesive does not go directly into the high melt zone, but is first exposed to the low melt zone. The heaters in the low melt zone function to premelt the newly added material prior to entry into the high melt zone, thereby stabilizing the temperature therein. Such a zone melter also reduces the amount of material exposed to the application temperature.

The above described zone melter is an acceptable device for stabilizing temperatures of the adhesive in the high melt zone. Such a device also reduces potential degradation of the adhesives (over that of a single stage melter because of the smaller volume of the high melt zone) while adhesive is being generally continuously applied. In such a situation, adhesive in the high melt zone is continuously drawn from that zone for use in application and adhesive from the low melt zone is continuously being introduced into the high melt zone. Thus, the amount of time which the adhesive is exposed to the application temperature when adhesive is being applied is limited.

Significant problems have also been encountered, however, with zone melters when application is terminated. In such a case, the heat from the high melt zone migrates upwardly through the low melt zone and ultimately to the entire feed hopper so that all of the adhesive in the unit is at or close to the application temperature. In many cases this will occur if the unit sits idle and is not used for as little as 10–15 minutes. Thus, any interruption of any significant time period in the use of a zone melter such as overnight, during work breaks, etc., results in the heat from the high melt zone migrating up through the entire unit. Similar to the single stage melters, this will also result in undesirable degradation or polymerization.

The above problem can be solved, to some extent, by turning off the melter during these down times or reducing the temperature control for the high melt zone to a lower temperature, however, this has a disadvantage in that the unit is not ready to go at all times. For example, if the unit is turned off completely, it could take up to an hour or more before the unit is again ready to operate. Time is also needed, if the temperature in the high melt zone is lowered, in order to increase the temperature back up to the application temperature.

Another attempt at solving the above problem has been to position the low melt zone to one side of, or laterally, with respect to the high melt zone or to physically separate the high melt zone from the low melt zone so that a separate mechanism or conduit is utilized to transfer adhesive from the low melt zone to the high melt zone. Although this has the effect of minimizing or eliminating the migration of heat from the high melt zone into the low melt zone and feed hopper, such a structure requires much more space, is more complicated and expensive and is therefore generally undesirable.

Accordingly, there is a need in the art for a hot melt adhesive heater or melter in which the various temperature zones are positioned vertically with respect to one another and in which the melter can be ready to use at all times, but which also limits or precludes migration of heat from the hot melt zone into the other zones of the unit even during significant down time periods. There is a further need for an adhesive melter having a quick cool-down feature so that temperatures in the high melt zone can be quickly reduced, if desired, for certain highly degradable adhesives.

SUMMARY OF THE INVENTION

In contrast to the prior art, the present invention is directed to an improved adhesive heater or melter in which the high melt or application zone and feed hopper are positioned vertically with respect to one another and which includes a means for eliminating or limiting the migration of heat from the hot melt zone to the feed hopper during down times of significant duration. In accordance with the method and apparatus of the present invention, this is accomplished by creating a thermal block or thermal barrier in the area between the high melt zone and the feed hopper to effectively preclude this heat migration. In the preferred embodiment of the present invention, the melter includes a high melt zone, a low melt or premelt zone and a feed hopper and the thermal barrier is created by providing the fins, which are normally used as heating fins in the low melt zone, with openings extending through their entire length. This permits cooling air or other fluid to be pumped through such openings to cool the material in the low melt zone and thus preclude migration of the heat from the high melt zone to the feed hopper.

Although the preferred embodiment and method contemplates providing the heating fins with appropriate openings so that cooling air or other fluid can be directed through such openings to cool the low melt zone, it is contemplated that other cooling means can be provided as well. For example, it is contemplated that a separate cooling coil can be positioned in the area of the low melt zone or immediately above the low melt zone or high melt zone (as the case may be) to limit or eliminate the migration of heat from the hot melt zone during down times.

The provision of such a cooling feature in a conventional zone heater or melter or even in a single stage melter enables the unit to be maintained in a ready state continuously, even during significant intervals of time such as overnight or extended work breaks, while minimizing possible degradation of adhesive material normally caused by such inactive periods.

Accordingly, it is an object of the present invention to provide an improved adhesive heater or melter which significantly reduces material degradation during down time.

Another object of the present invention is to provide an improved adhesive zone heater or melter in which the high melt and low melt zones are positioned vertically with respect to one another and which includes means for eliminating or limiting the migration of heat from the high melt zone upwardly through the system.

A further object of the present invention is to provide an improved method and apparatus for creating a thermal block or barrier in an adhesive heater or melter to limit or preclude migration of heat from the high melt zone during down time.

A still further object of the present invention is to provide a method and apparatus for creating a thermal block or barrier in a hot melt adhesive zone heater or melter by providing the low melt cooling fins with openings for circulation of cooling air.

These and other objects of the present invention will become apparent with reference to the drawings, the description of the preferred embodiment and method and the appended claims.

DESCRIPTION OF THE DRAWINGS

FIG. 5 is a cross-sectional view along one of the low melt module fins as viewed along the section line 5—5 of FIG. 2.

FIG. 6 is a front elevational view, with a portion broken away, showing the low melt module and the position of the cooling tubes with respect thereto.

FIG. 7 is a top view of the high melt module usable in the zone melter of the present invention.

FIG. 8 is a side view of the high melt module usable in the zone melter of the present invention.

DESCRIPTION OF THE PREFERRED EMBODIMENT AND METHOD

Figure 1:
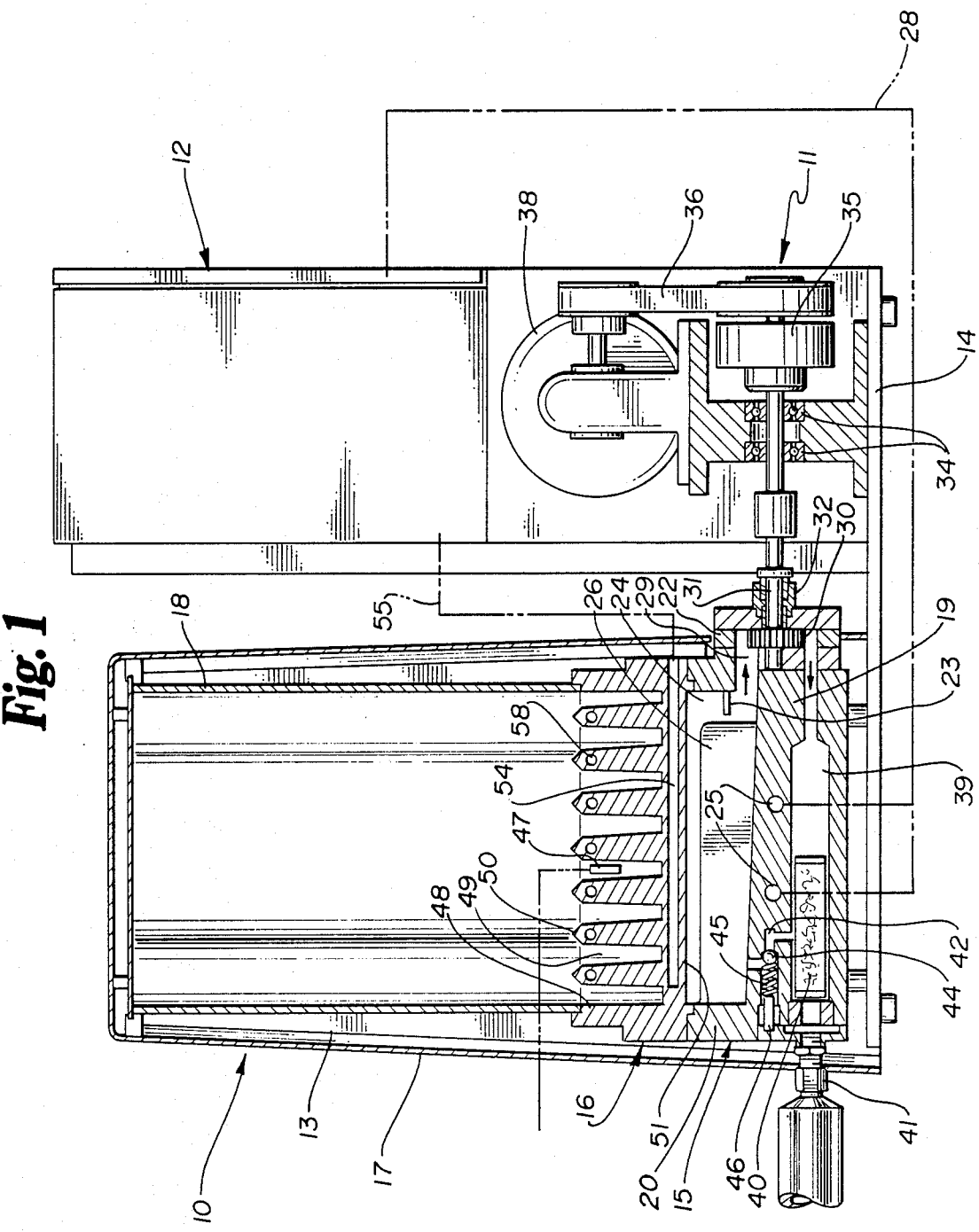
FIG. 1 is an elevational view, partially in section, of a zone melter for hot melt adhesives incorporating the improvement of the present invention.
Figure 2:
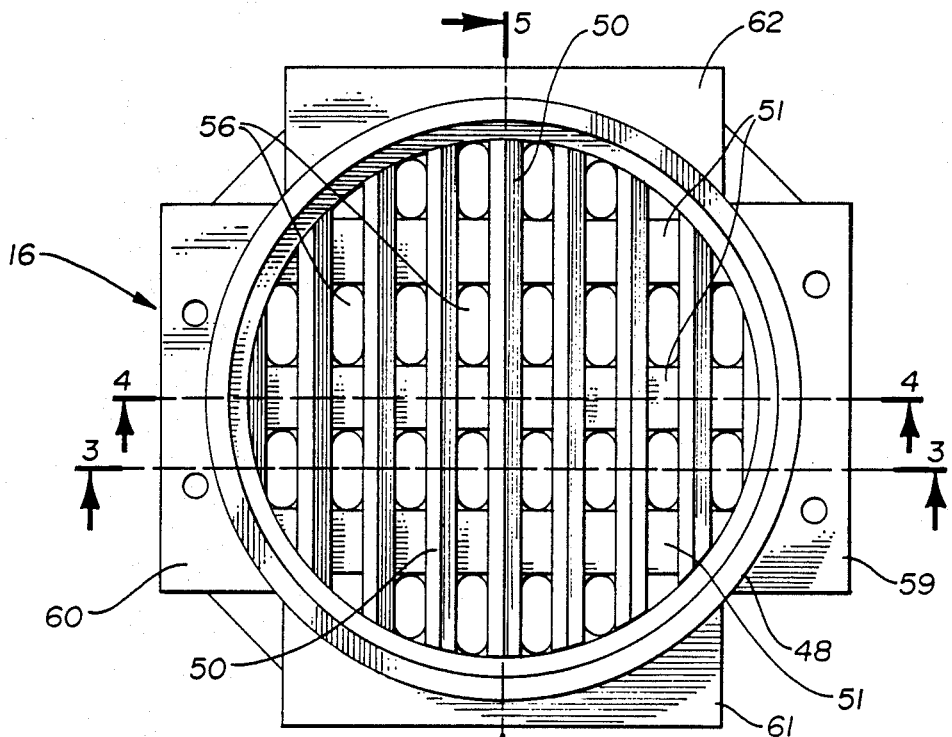
FIG. 2 is a top, plan view of the low melt module usable in the zone melter of the present invention.
Figure 3:
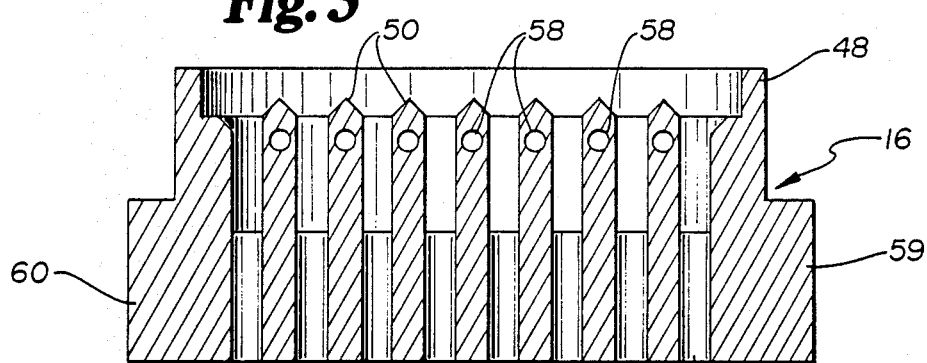
FIG. 3 is a cross-sectional view of the low melt module as viewed along the section line 3—3 of FIG. 2.
Figure 4:
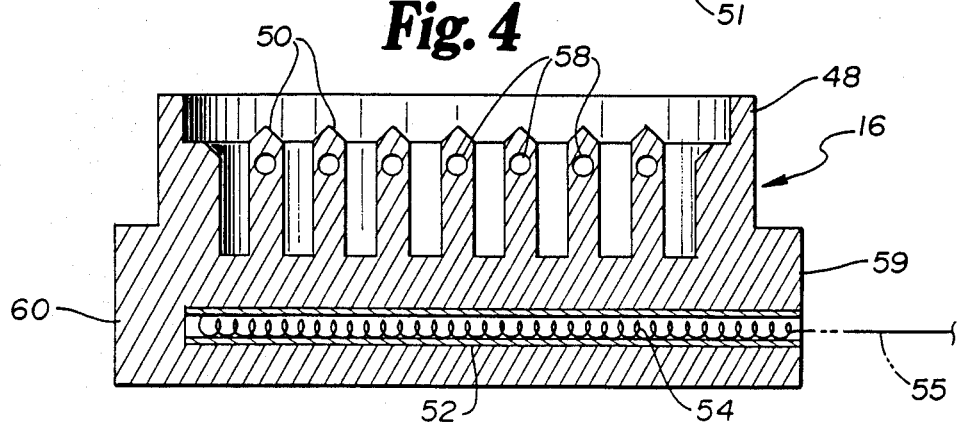
FIG. 4 is a cross-sectional view of the low melt module as viewed along the section line 4—4 of FIG. 2.

Reference is first made to FIG. 1 showing a view, partially in section, of a zone melter for hot melt adhesives incorporating the features of the present invention. In general, the zone melter of the present invention includes a melter and reservoir component 10, a motor component 11 and a control panel component 12. The entire assembly is mounted on an appropriate base 14.

The melter and reservoir component 10 comprise a high melt module 15 which maintains the adhesive at the desired and preset application temperature, a low melt or premelt module 16 positioned vertically above the module 15 for initially melting the adhesive and raising it to a preset, desired temperature for introduction into the high melt zone and a reservoir portion comprising a generally cylindrical feed hopper 18 positioned vertically above the low melt module 16 for receiving raw, unmelted adhesive. The entire melter and reservoir component 10 is surrounded by a layer of insulation 13 and a shroud 17.

The high melt module 15 is a conventional high melt module and includes a main body portion 19, an outer housing portion 20 which defines a generally cylindrical high melt chamber 24 and a gear pump housing 22 connected with a portion of the section 20. As illustrated best in FIGS. 1 and 7, the outer wall portion 20 of the high melt module includes a generally cylindrical bore which defines the high melt chamber 24. The main body portion 19 includes generally laterally extending openings for receiving a plurality of conventional heating rods 25. A plurality of high melt heat dissipation fins 26 are connected with the portion 19 and disposed within the chamber 24 for assisting in transferring heat from the heating rods 25 to the adhesive contained in the high melt zone or chamber 24. As illustrated schematically in FIG. 1, each of the heating rods 25 is electrically connected via appropriate means 28 to the control panel 12. An appropriate temperature probe or sensor 23 is positioned in the chamber 24 and electrically connected with the control panel 12 for maintaining the application temperature within the chamber 24.

The pump housing 22 which is connected with an outer side surface of the housing 20 defines a pumping chamber 29 and is provided with a plurality of gear pumps 30. As shown best in FIG. 8, the preferred embodiment includes three such pumps 30, each of which is in communication with the pumping chamber 29, which in turn communicates with the chamber 24.

Each of the gear pumps 30 is supported on a shaft 31 which in turn is supported by the bearings 32 within a portion of the pump housing 22 and the bearings 34 within the motor housing. In the preferred embodiment, the shaft 31 extends into the motor housing 11 where it is connected with a clutch 35 and a motor 38 via an appropriate belt 36 or other motion transmitting means.

As a result of rotation of the gear pumps 30, adhesive within the high melt chamber 24 is pumped from the chamber 24, through the respective pump chambers 29 and into a filter chamber 39 associated with each pump. The filter chambers 39 are formed within a portion of the main body 19. As illustrated best in FIG. 1, a filter element 40 is positioned in each filter chamber 30 to filter the adhesive prior to passage through a conduit section 41 for delivery to a conventional adhesive applicator.

A relief valve assembly is associated with each of the filter chambers 39 to permit adhesive within the filter chambers 39 to be recycled back into the high melt chamber 24 when the adhesive applicator is not operating or when the adhesive applicator is withdrawing adhesive from the chamber 39 at a rate less than that being supplied by the pump 30.

In the preferred embodiment, the relief valve includes a port 42 extending between each of the filter chambers 39 and the high melt chamber 24, a ball valve or other similar valve element which is adapted for sealing relationship with respect to a portion of the port 42, a coil spring 45 biasing the valve member 44 into sealing relationship and a plug member 46. If the pressure within the filter chamber 39 rises to a level sufficient to overcome the force of the spring 45, the valve 44 is moved rearwardly against the force of the spring 45, thereby permitting the adhesive within the filter chamber 39 to flow into the high melt chamber 24. These relief valves permit the adhesive within the system to be recycled, thereby minimizing hot spots and maintaining substantially uniform temperature throughout the entire high melt module.

The low melt module which is illustrated best in FIGS. 1, 2, 3, 4 and 5 includes an outer wall section 48 having a generally cylindrical configuration and defining a low melt or premelt chamber 49. A plurality of heat exchange fins 50 are positioned laterally across the low melt zone 49 and extend from one side of the cylindrical side wall portion 48 to the other. As illustrated best in FIGS. 2, 3 and 4, a plurality of heater element housing portions 51 extend laterally across the low melt zone 49 from one end of the side wall 48 to the other and at generally right angles to the heat exchange fins 50. As illustrated belt in FIG. 4, each of the heater housing portions 51 is provided with an elongated opening 52 for receiving a conventional heater element 54. Each of the elements 54 is electrically connected with the control panel 12 (FIG. 1) of the unit by appropriate electrical connection means illustrated schematically in FIG. 4 by reference numeral 55. The low melt zone 49 is also provided with a thermal couple or other heat sensing probe 47 which is electrically connected with the control panel for controlling the temperature within the zone 49.

Although the preferred embodiment illustrates the heater housing portions 51 extending at generally right angles to the heat exchange fins 50, it is contemplated that the features and advantages of the present invention can also be achieved by extending such housing portions in a direction generally parallel to the heat exchange fins 50 or by disposing the heating rods 54 within openings in a portion of the heat exchange fins 50. It is believed, however, that positioning the heating elements 54 in a direction perpendicular to the fins 50 results in a better transfer of heat from the elements 54 to all of the fins 50 and thus a more uniform distribution of heat within the low melt zone 49.

A plurality of holes or openings 56 are provided within the low melt module to permit adhesive which has been initially melted in the low melt zone 49 to flow into the high melt chamber 24 (FIG. 1). In the preferred embodiment these flow openings 56 are positioned between adjacent heat exchange fins 50 and between the adjacent heater housing members 51. The openings 56 are provided with rounded corners to reduce the dead space within the low melt module, thereby minimizing any possible overheating of adhesive in the low melt zone 49.

A plurality of the fins 50 are provided with a cooling opening 58 for the purpose of providing cooling air or other fluid to the heat exchange fins 50 to create a thermal barrier, when desired, between the high melt zone 24 (FIG. 1) and the generally unmelted adhesive in the feed hopper 18. Although the preferred embodiment illustrates a cooling hole 58 being formed in each of the free standing heat exchange fins 50, the exact number of fins can vary. For example, in some units, it may be possible to obtain sufficient cooling with only two or three holes or openings 58, while in other units and with other temperature parameters, it may be desirable to provide a plurality of holes 58 in each of the fins. The principal purpose of the cooling openings 58 is to provide a thermal barrier between the high melt zone 24 and the unmelted adhesive in the hopper 18 so that during times when the applicator is not operative, migration of heat from the high melt zone toward the adhesive in hopper 18 can be prevented by forcing cooling air through the openings 58.

Although the preferred embodiment illustrates the cooling openings 58 to be formed within the heat exchange fins 50 themselves, it is contemplated that separate cooling tubes or coils could be disposed within the low melt chamber 49 or immediately thereabove if desire.

Figure 10:
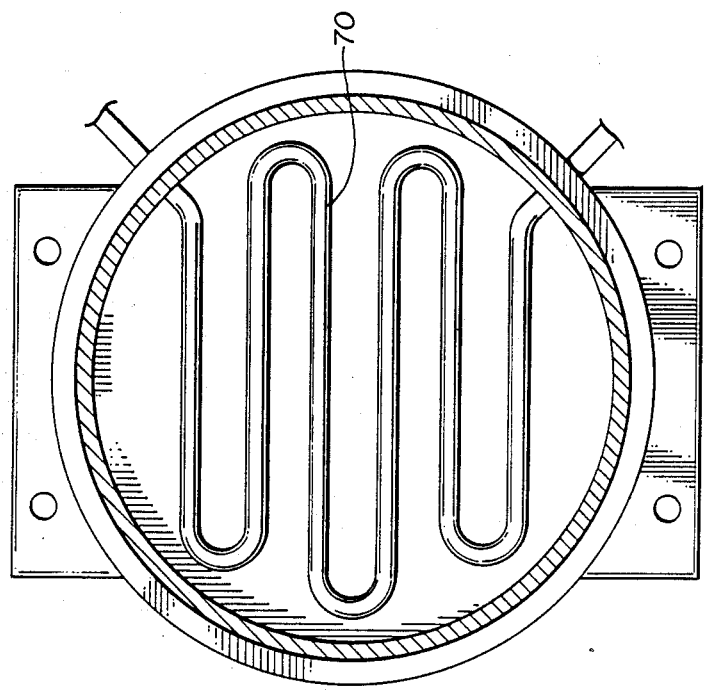
FIG. 10 is a view, partially in section, as viewed along the section line 10—10 of FIG. 9 showing the alternate cooling means.
Figure 9:
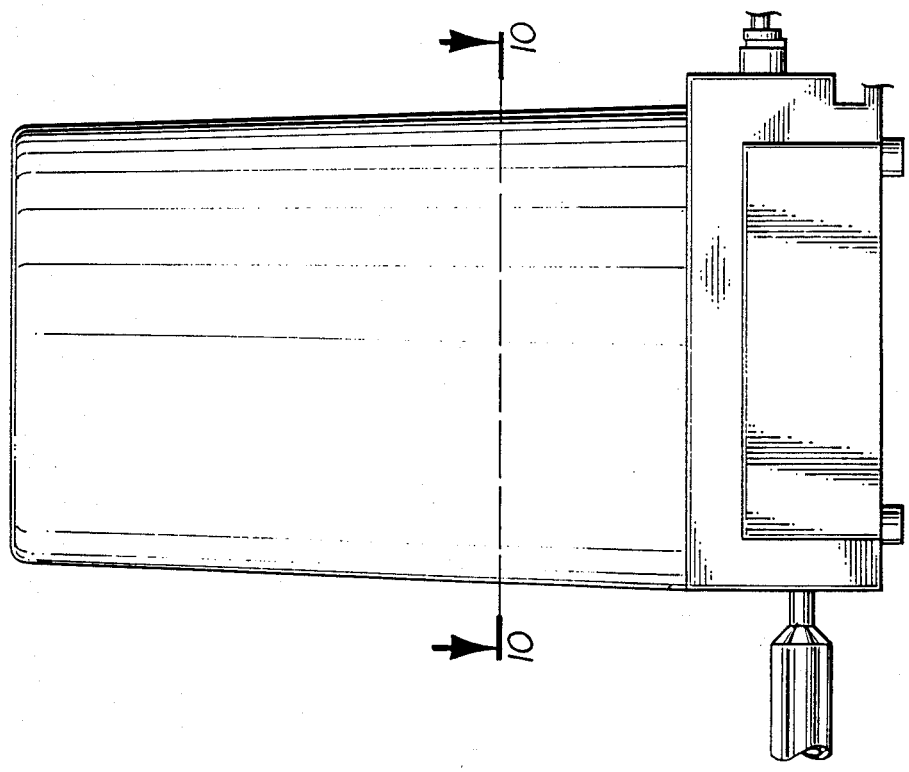
FIG. 9 is a front view of an alternate embodiment of an adhesive melter incorporating an alternate cooling means.

An alternate embodiment incorporating such tubes or coils 70 is illustrated in FIGS. 9 and 10. In this embodiment, the tubes or coils 70 are positioned above the application zone. It is contemplated, however, that this embodiment could also include a low melt zone, in which case the coils 70 would be positioned above the low melt zone.

The low melt module 15 of FIG. 1 includes a pair of heater element manifolds 59 and 60 integrally formed with an outer portion of the side wall 48 and disposed on opposite sides of the module 15. Also formed with the side wall 48 is a pair of cooling air manifolds 61 and 62. The cooling air manifolds 61 and 62 are positioned on opposite sides of the low melt module 15.

Each of the cooling air manifolds 61 and 62 includes a lateral manifold port 64 (FIGS. 5 and 6) which intersects with and is disposed at right angles with each of the cooling air openings 58. Thus, by introducing cooling air into one end of the port 64 in either the manifold 61 or 63, and plugging the other, cooling air is forced to pass through the openings 58 and then to and out through the port 64 in the other of the manifolds 61 or 62. The openings 58 can be cast by embedding stainless steel or other tubes in the mold prior to casting or can be drilled after casting is completed. In either case, the outer ends of the openings are normally closed by plugs 68. As shown schematically in FIG. 6, one end of one of the manifold ports 64 is connected with an appropriate conduit 65 for supplying cooling air from a pump 66 or other cooling air source. In the preferred embodiment and method, the cooling air is at the ambient temperature; however, it is contemplated that the air could be artificially cooled for use in the present method.

Having described the structure of the present invention in detail, the operation can be understood as follows. Upon initial start up of the system, hot melt adhesive, in solid or highly viscous form, is introduced into a top opening of the feed hopper 18. As a result of contact with the heat exchange fins 50, the adhesive particles will be heated and begin to melt. As they are melted and changed to liquid or less viscous form, they flow downwardly through the openings 56 (FIG. 2) and into the high melt chamber 24. Heating of the material within the chamber 24 is continued until the application temperature is reached. This heating within the high melt zone 24 is accomplished by the heating elements 25 which include appropriate thermal couples or other heat sensing probes electrically connected by appropriate conductors to the control component 12. During normal operation of the device of the present invention, and depending on the particular adhesive being used, the application temperature of adhesive within the high melt zone 24 will be maintained at a temperature of approximately 400°–450° F.

The heating of the materials in the low melt zone 49 is accomplished by the heater elements 54. In normal operation, the thermal couples or heat sensing elements by which these heater elements 54 are controlled will be set to preheat material in the low melt zone when it drops below a certain preselected temperature and to turn off when the temperature rises to a second preselected temperature. This low melt zone temperature normally will be about 50° to 100° F. lower than the high melt zone temperature. Thus, a typical low melt zone temperature would be about 300° to 350° F.

When the system is being operated continuously so that adhesive in the high melt zone is being withdrawn from the system through the conduit 41, adhesive is continuously being passed from the hopper 18 into the low melt zone 49 and from the low melt zone 49 to the high melt zone 24. During such operation, the time during which the adhesive is exposed to the application temperature in the zone 24 is limited.

However, if the applicators should be turned off for any significant period of time (as little as a few minutes or more), the heat from the high melt zone 24 will begin to migrate up through the entire system. This heat migration will first cause the adhesive temperature in the low melt zone to rise until it reaches a preselected temperature sensed by the temperature probe or sensor 47. The cooling means is then actuated by causing cooling air to pass through the openings 58. This tends to cool the fins 50, and thus the adhesive in the low melt zone, and to create a thermal barrier at this point. Such thermal barrier stops further migration of heat from the high melt chamber 24 in the above described circumstance when the adhesive applicators are turned off.

As described previously, the cooling mechanism, in the form of a plurality of cooling openings formed within the heat exchange fins 50 is actuated by an appropriate switch or control mechanism which 67 is in turn triggered by a thermal couple or other heat sensing member 47 positioned in the low melt zone 49 or immediately above it. When this thermal couple senses a temperature which exceeds a certain desired temperature, the cooling air is actuated and it will continue until the temperature falls below a second preselected temperature, at which time the cooling means will be deactivated. The preferred temperature band between the above first and second preselected temperatures is approximately 5°–7° F. Preferably the cooling means maintains the adhesive at a low enough temperature to avoid undesirable degradation, but at a high enough temperature to maintain sufficient viscosity to permit flow of the adhesive.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

I claim:

1. A melter for adhesives or the like comprising:
    a high melt zone having high melt heater means for heating said adhesive in said high melt zone to a preselected application temperature;
    a feed hopper for containing adhesive disposed directly vertically above said high melt zone, whereby, during operation, said adhesive flows generally vertically along an adhesive flow path from said hopper to said high melt zone;
    thermal barrier means disposed vertically above said high melt heater means and vertically below at least a substantial portion of said feed hopper for limiting the migration of heat from said high melt zone to said feed hopper, said thermal barrier means including cooling means comprising at least one cooling conduit disposed within and extending across said adhesive flow path;
    a source of coolant connected to said cooling conduit; and
    means for actuating said cooling means when the temperature at a point vertically above said high melt heater means exceeds a first preselected cooling temperature.

2. The melter of claim 1 including a plurality of heat exchange fins disposed vertically above said high melt zone.

3. The melter of claim 2 wherein said cooling conduit includes a cooling opening extending through at least one of said heat exchange fins.

4. The melter of claim 1 wherein said cooling conduit includes a cooling tube and means for causing the passage of said coolant through said cooling tube.

5. The melter of claim 1 including a low melt zone disposed vertically between said high melt zone and said thermal barrier means and having low melt heater means for heating said adhesive in said low melt zone to a preselected premelt temperature.

6. The melter of claim 5 including a plurality of heat exchange fins disposed within said low melt zone.

7. The melter of claim 6 wherein said cooling conduit includes a cooling opening extending through at least one of said heat exchange fins.

8. The melter of claim 7 including means for selectively providing said coolant to said cooling opening.

9. The melter of claim 6 wherein said plurality of heat exchange fins are elongated, are generally parallel to one another and extend generally across said low melt zone.

10. The melter of claim 9 wherein said low melt heater means includes at least one elongated low melt heater element connected with a portion of said heat exchange fins and extending generally perpendicular to said heat exchange fins.

11. The melter of claim 10 wherein said cooling conduit includes a cooling opening extending through at least one of said heat exchange fins.

12. The melter of claim 5 wherein said cooling means is disposed between said low melt heater means and said feed hopper.

13. The melter of claim 1 being a zone melter for application of hot melt adhesives.

14. The melter of claim 1 including control means for activating said cooling means above said first preselected cooling temperature and deactivating said cooling means below a second preselected cooling temperature.

15. The melter of claim 1 including a coolant manifold connected with said at least one cooling conduit.

16. A melter for adhesives or the like comprising:
- a high melt zone having high melt heater means for heating said adhesive in said high melt zone to a preselected application temperature;
- a low melt zone disposed vertically between said high melt zone and said thermal barrier and having low melt heater means for heating said adhesive in said low melt zone to a preselected premelt temperature;
- a plurality of elongated, generally parallel heat exchange fins disposed within and extending generally across said low melt zone wherein said low melt heater means includes at least one elongated low melt heater element connected with a portion of said heat exchange fins and extending generally perpendicular to said heat exchange fins;
- a feed hopper disposed vertically above said high melt zone;
- cooling means including a cooling opening extending through at least one of said heat exchange fins and disposed vertically above said high melt heater means and said low melt heater element;
- a source of coolant connected to said cooling opening; and
- means for actuating said cooling means when the temperature at a point vertically above said high melt heater means exceeds a first preselected cooling temperature.

17. A melter for adhesives or the like comprising:
- a high melt zone having high melt heater means for heating said adhesive in said high melt zone to a preselected application temperature;
- a low melt zone disposed vertically between said high melt zone and said thermal barrier and having low melt heater means for heating said adhesive in said low melt zone to a preselected premelt temperature;
- a plurality of heat exchange fins disposed within said low melt zone,
- a feed hopper disposed vertically above said high melt zone;
- cooling means disposed vertically above said high melt heater means wherein said cooling means includes a cooling opening extending through a plurality of said heat exchange fins;
- a cooling air manifold connected with said cooling openings; and
- means for actuating said cooling means when the temperature at a point vertically above said high melt heater means exceeds a first preselected cooling temperature.

* * * * *